United States Patent [19]
Zimmerli

[11] 4,364,497
[45] Dec. 21, 1982

[54] DEVICE FOR SUPPORTING PARCELS ON A PARCEL RACK OF A TWO-WHEELED VEHICLE

[76] Inventor: Paul Zimmerli, CH-4467 Rothenfluh, Switzerland

[21] Appl. No.: 233,729

[22] Filed: Feb. 12, 1981

[30] Foreign Application Priority Data

Feb. 18, 1980 [CH] Switzerland .................. 1304/80

[51] Int. Cl.³ ............................................. B62J 9/00
[52] U.S. Cl. .................................... 224/40; 224/39; 224/32 A; 294/118
[58] Field of Search ............... 224/30 R, 30 A, 39, 224/40, 42, 32 A; 294/118, 3

[56] References Cited
U.S. PATENT DOCUMENTS

| | | | |
|---|---|---|---|
| 272,320 | 2/1883 | Ralston | 294/118 |
| 555,472 | 2/1896 | Brosnan | 224/40 |
| 1,287,369 | 12/1918 | Luthman | 294/118 |
| 2,890,819 | 6/1959 | Glenny | 224/32 A |
| 4,258,870 | 3/1981 | Edelson | 224/39 X |

*Primary Examiner*—Steven M. Pollard
*Attorney, Agent, or Firm*—Pollock, Vande Sande & Priddy

[57] ABSTRACT

A parcel supporting device to be used in conjunction with the parcel rack of a two-wheeled vehicle, e.g. a bicycle, is adapted to carry additional parcels, e.g. shopping bags, positioned laterally from and above the rear wheel of the vehicle, so that they don't interfere with the movements of the rider. The device is equipped with means for suspending the parcels consisting preferably of two levers pivotably connected with and crossing one another in a scissorslike manner and being hook-shaped at their parcel-receiving ends. The suspending means may be removable from or built integral with the parcel rack.

6 Claims, 4 Drawing Figures

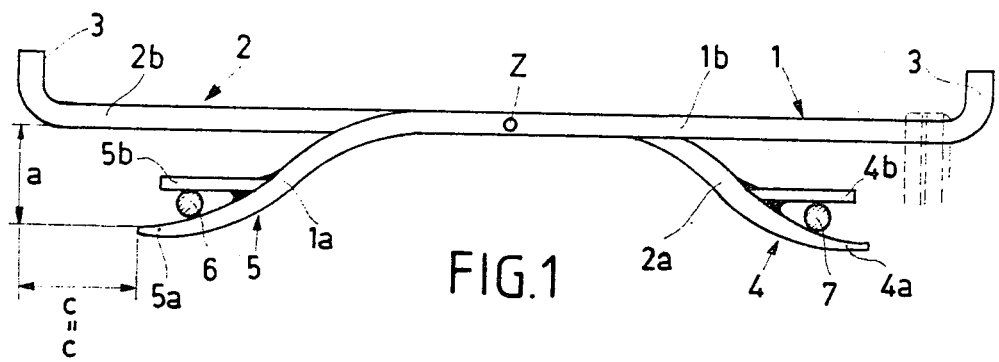
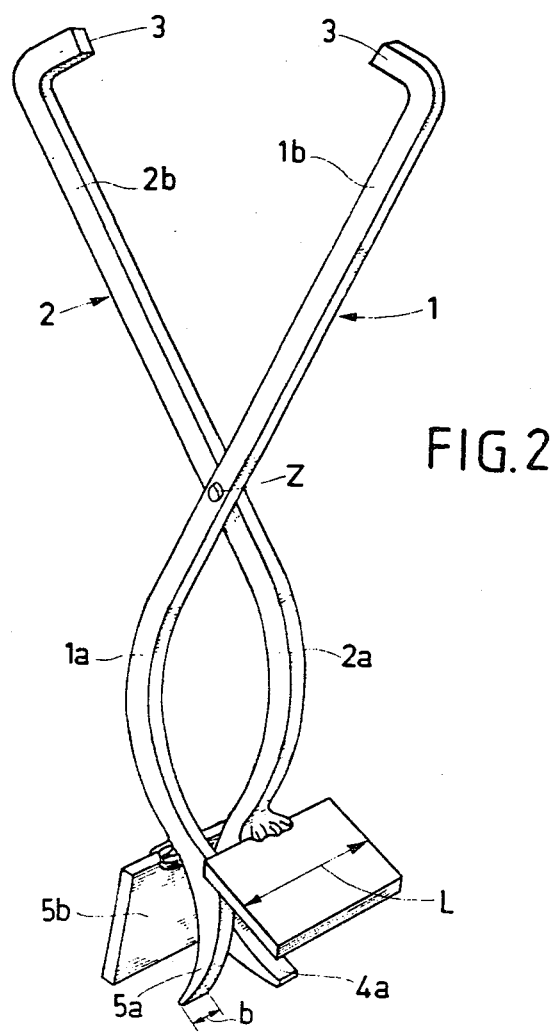

DEVICE FOR SUPPORTING PARCELS ON A PARCEL RACK OF A TWO-WHEELED VEHICLE

BACKGROUND OF THE INVENTION

1. Field of the Invention

The invention concerns a device for supporting parcels on a parcel rack of a two-wheeled vehicle, such as a bicycle.

2. Description of the Prior Art

Parcels can be advantageously transported on two-wheeled vehicles, as on bicycles, on the parcel rack generally provided on such vehicles. However, such parcel racks are limited in their carrying capacity and one often sees parcels or shopping bags hung on the steering bar of a bicycle. This, however, makes the ride unsafe and difficult because the parcels may pull in one direction and undesirably influence the steering process. Furthermore, the parcels may interfere with the rider's legs and become unwanted accident risks.

SUMMARY OF THE INVENTION

An object of the present invention is to avoid the abovementioned disadvantages of known parcel racks and to create a device for supporting parcels, such as bags, the device to be used in conjunction with the parcel rack of two-wheeled vehicles and to provide a means for safely suspending the parcels on the vehicle while materially reducing the risks of accidents.

The foregoing and other objects are attained in accordance with one aspect of the present invention through the provision of means for detachably suspending parcels in a freely hanging position laterally from the rear wheel of the vehicle.

BRIEF DESCRIPTION OF THE DRAWINGS

Various objects, features and attendant advantages of the present invention will be more fully appreciated as the same becomes better understood from the following detailed description of embodiments thereof when considered in connection with the accompanying drawings, in which:

FIG. 1 shows a front view of the supporting device in the state in which it is to be mounted on the parcel rack of a bicycle, FIG. 2 shows the device in its folded state of transportation, in perspective.

DETAILED DESCRIPTION OF THE PREFERRED EMBODIMENTS

Figure 3:
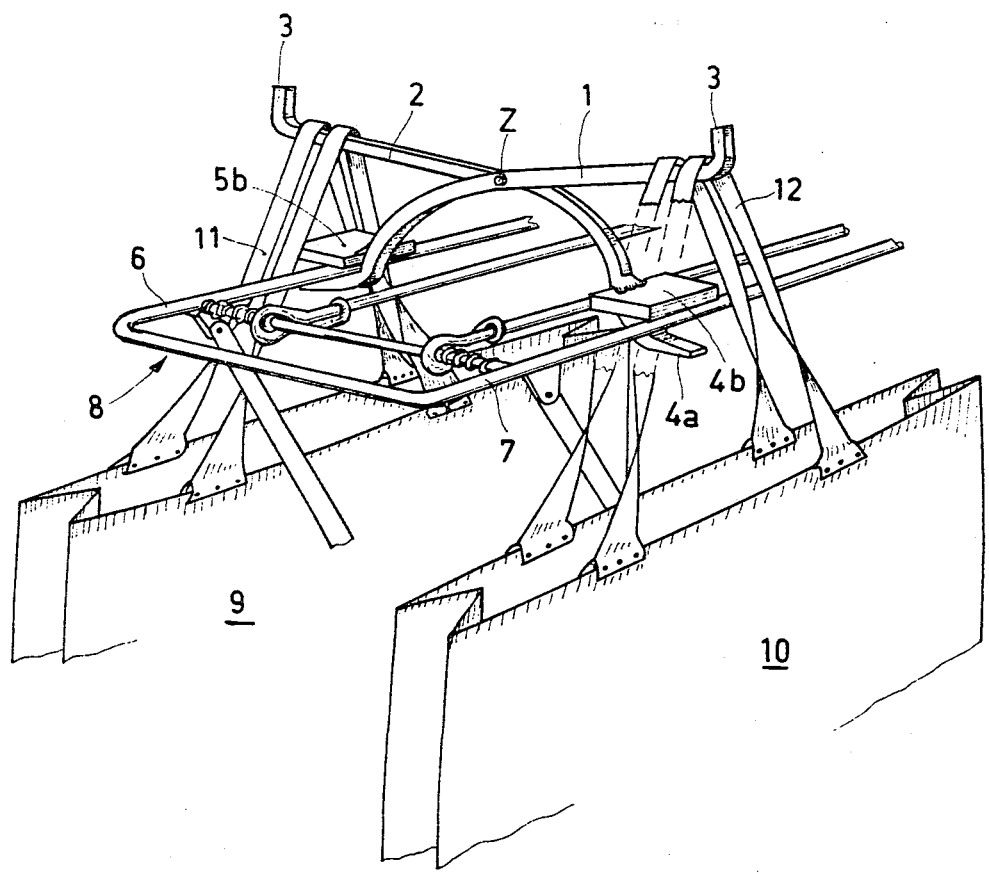
FIG. 3 shows the device mounted on the parcel rack of a bicycle and carrying two shopping bags, in perspective

The parcel supporting device comprises two two-armed levers 1, 2 pivotably connected with one another at a crossing point by means of a pin Z constituting a pivot axis. Each lever comprises a lower segment 1a, 2a bent curved, as well as an upper segment 1b, 2b running essentially straight. The upper segment 1b, 2b of each lever 1, 2 is bent at its outer each in the shape of a hook 3. The hook 3 could be replaced by a different receiving member, adapted to accept a bag or another parcel for suspension.

The lower end segments 1a, 2a of the two levers 1, 2 are provided with mounting members 4, 5, each comprising two support members 4a, 4b and 5a, 5b and having the distance between them increasing in an outward direction. In FIG. 1 the lower support members 4a, 5a are constructed to be the extremities of the levers 1, 2, whereas the upper support members 4b, 5b constructed as stabilizing plates may either be fastened onto the levers 1, 2 or, if the embodiment is made of plastic, be made in one piece with the levers 1, 2.

By reason of the aforementioned constructions, the mounting members 4, 5 may be placed over the two longitudinal beams 6 and 7 of a parcel rack 8, by sliding them from the inside toward the outside, until they assume their mounted position. In this connection it is of special significance, that the upper mounting members 4b and 5b possess a length dimension L measured parallel to the pivot axis Z of the levers (FIG. 2), which amounts to a multiple of the lever width b. In this way, the mounting members 4b and 5b act as stabilizing members, safely preventing the mounted device from tipping over. Moreover, as shown in FIG. 1, in the mounted position of the device the lever segments 1b, 2b are disposed a distance a above the support members 4a, 5a and the hook-shaped recovery members 3 protrude a distance c beyond the mounting members 4,5.

FIG. 3 shows a conventional parcel rack 8 consisting of a flat carrier frame comprising the longitudinal beams 6 and 7, adapted to receive the mounting members 4 and 5 of the levers 1 and 2. Two bags 9 and 10 are suspended by way of strap-shaped handles 11, 12 on the upper ends of the levers 1, 2 and are held by the hooks 3 from falling off. Due to the tension force exerted by the two bags 9 and 10 onto the levers 1, 2, the mounting members 4 and 5 are pressed, by virtue of the scissors effect, against the longitudinal beams 6 and 7 of the parcel rack 8 and are held, as a result, in cooperation with the stabilizing members 4b and 5b, securely in place. Even if the load is unilaterally applied, by only one bag, the levers 1, 2 would remain secured.

Since the distance between the two support members 4a, 4b and 5a, 5b continuously increases from the inside toward the outside, the mounting members 4, 5 may be positioned on longitudinal beams of parcel racks of varying sizes. A standard embodiment intended for use with only one parcel rack size could have the two support members 4a and 5a provided with slots on their surfaces facing down, said slots to be snapped into the longitudinal beams 6 and 7.

In FIG. 3 the bags 9 and 10 are suspended on the two sides of the parcel rack in such a way, that their handles 11 and 12 extend on both sides of the stabilizing members 4b and 5b and bear at the same time against the outer surfaces of the longitudinal beams 6 and 7. The bags 9 and 10 are securely held on the two sides of the rear wheel of the two-wheeled vehicle in suspended position, and cannot jeopardize the steering of the vehicle. The levers 1 and 2 may be unmounted from the parcel rack relatively quickly, when required, and stored away in a bag. The levers 1 and 2 require very little space in their folded states according to FIGS. 1 and 2.

Figure 4:
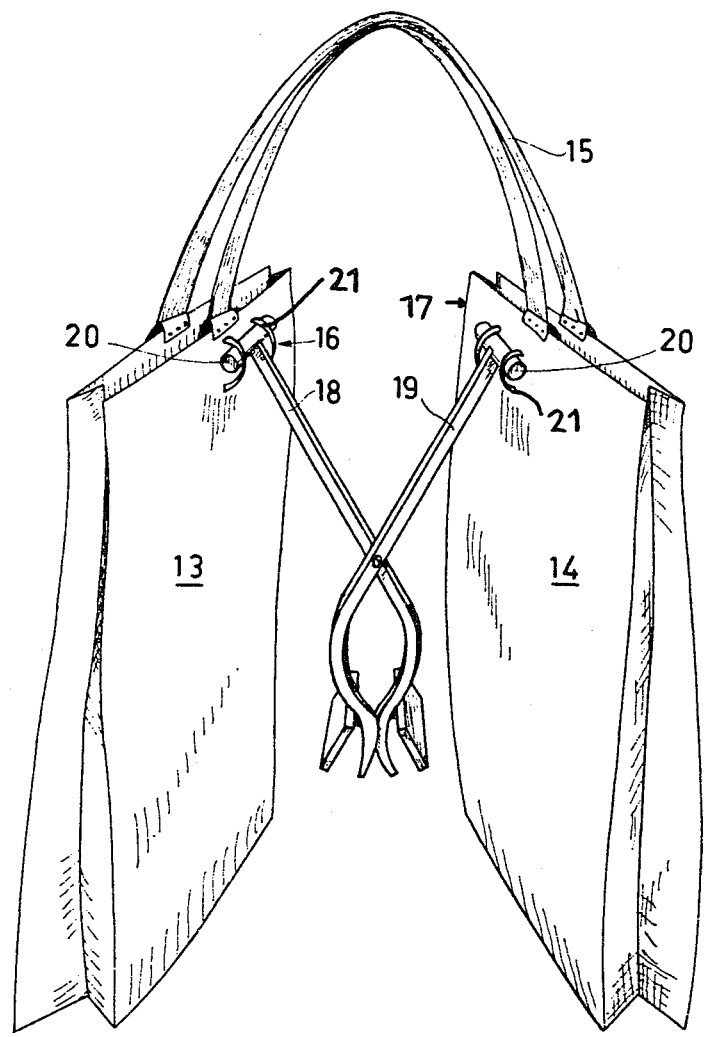
FIG. 4 shows another embodiment of the device, in perspective.

In a further embodiment shown in FIG. 4 the two bags 13, 14 are joined to one another by means of the common handles 15. The ends 16, 17 of the two levers 18, 19 are fastened on the inner surface of the two bags facing one another. The ends 16 and 17 comprise pins 20 disposed transversely to the longitudinal direction of levers 18, 19 and removably supported on the bags by means of the holding cords 21. The holding cords 21 are sewn into the inner surfaces of the bags 13, 14 or are fastened thereto in some other manner.

In the embodiment of FIGS. 1 to 4 the supporting device consisting of the levers 1, 2 and parts 3, 4 may be unmounted together from the parcel rack proper.

In another embodiment not separately shown, the supporting device is built in one piece with the parcel rack 8.

Numerous modifications and variations of the present invention are possible in the light of the above teachings. It is therefore to be understood that within the scope of the appended claims the invention may be practiced otherwise than as specifically described herein.

What is claimed is:

1. A device for supporting parcels on a parcel rack of a two-wheeled vehicle, comprising means for detachably suspending parcels in a freely suspended position laterally from the rear wheel of the vehicle, said means consisting of two elongated levers which are pivotably connected to one another at a common pivot axis and cross one another in a scissorslike manner, the upper end of each lever being constructed as a receiver for the parcel, and the lower end of each lever being provided with a mounting member mountable from the inside on a longitudinal beam of the parcel rack in such a way that, when the parcel rack is subjected to the load of one or more suspended parcels, both mounting members are pressed against the longitudinal beams of the parcel rack.

2. A device as claimed in claim 1, wherein the receivers are shaped as hooks and the mounting members are provided with mouthshaped openings.

3. A device as claimed in claim 1, wherein the two levers are each curved along one segment thereof disposed below the common pivot axis, the segments of said levers above said pivot axis being essentially straight.

4. A device as claimed in claim 1 wherein the receivers are hook-shaped and, in their mounted position, are located above and protrude outwardly of the mounting members.

5. A device as claimed in claim 1, wherein each mounting member comprises two support members, the distance between the two support members increasing in an outward direction.

6. A device as claimed in claim 5, wherein one of said two support members is constructed to be the extremity of the respective lever, the other support member being a stabilizing plate mounted on the lever and having its length dimension running parallel to the pivot axis of the levers, the length of said stabilizing plate being a multiple of the lever width whereby the levers are stabilized against tilting by said stabilizing plates.

* * * * *